Figure 1:
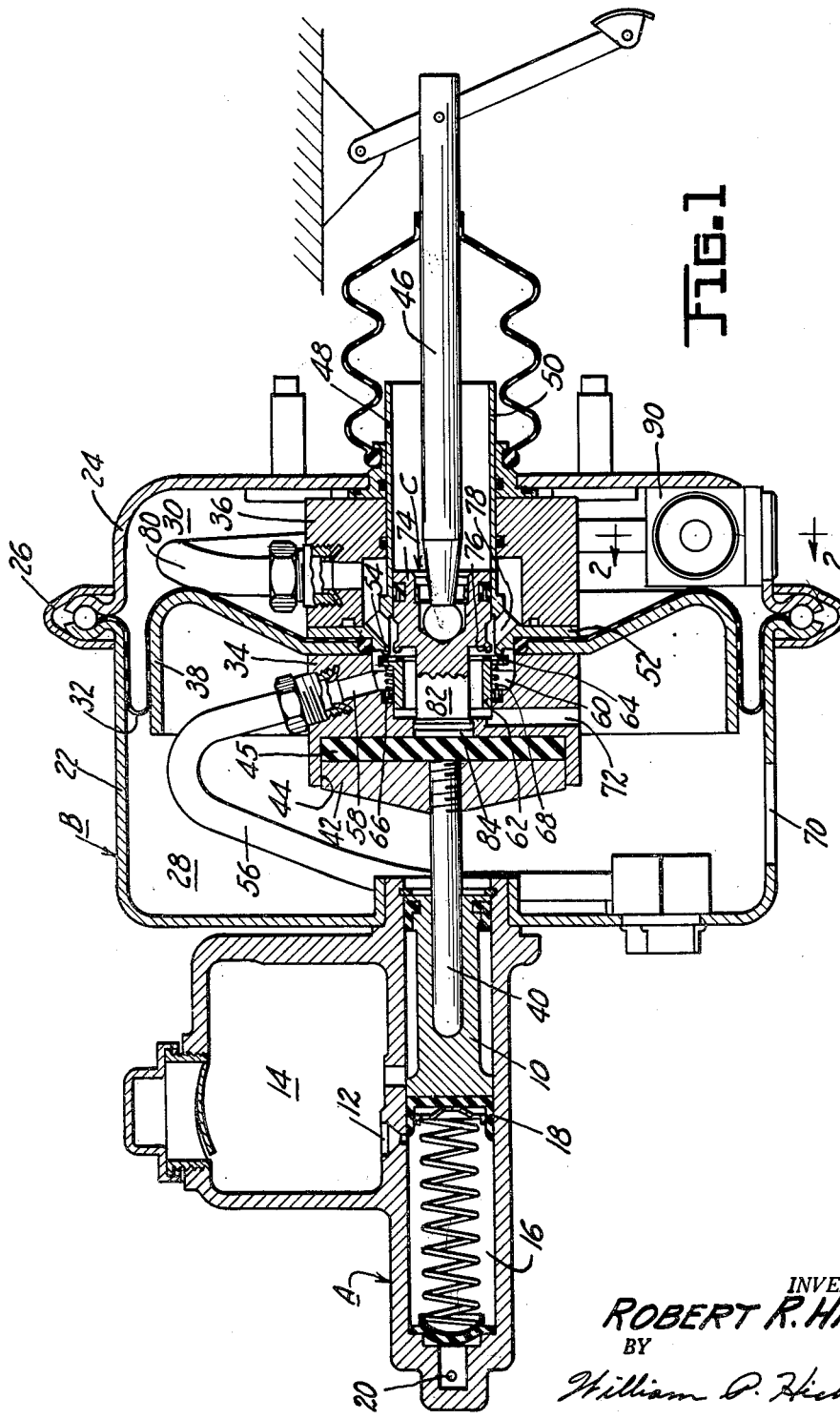

Feb. 27, 1962   R. R. HAGER   3,023,053
PNEUMATIC SERVOMOTOR UNIT
Filed June 30, 1960   2 Sheets-Sheet 2
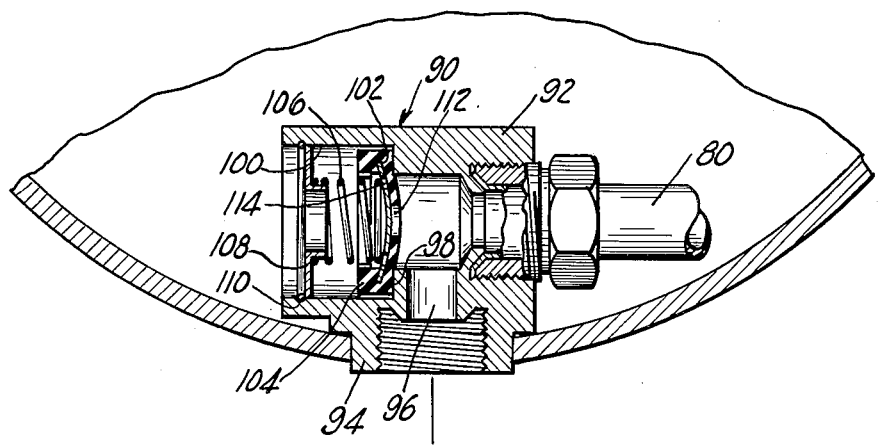
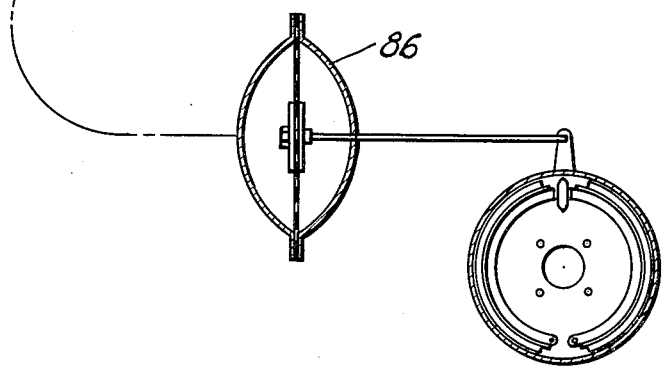
FIG. 2
INVENTOR.
ROBERT R. HAGER
BY
William P. Hickey
ATTORNEY 3,023,053
PNEUMATIC SERVOMOTOR UNIT
Robert R. Hager, Elkhart, Ind., assignor to The Bendix Corporation, South Bend, Ind., a corporation of Delaware
Filed June 30, 1960, Ser. No. 39,982
3 Claims. (Cl. 303—7)

The present invention relates to pneumatic braking systems for tractor-trailer vehicles; and more particularly to a more adequate type of fluid pressure servomotor which will cause the brakes of the two portions of the vehicle to be applied more evenly.

An object of the present invention is the provision of a new and improved fluid pressure servomotor for the above described systems which will cause the brakes of the trailer portion of the vehicle to be applied at approximately the same rate as that of the brakes of the tractor portion.

A still further object of the invention is the provision of a new and improved fluid pressure servomotor which has an output connection to which it supplies one actuating fluid pressure for connecting to remotely located braking mechanisms, and which supplies a lower actuating pressure upon its own power driven elements.

The invention resides in certain constructions, combinations and arrangements of parts; and further objects and advantages of the invention will become apparent to those skilled in the art to which the invention relates from the following description of a preferred embodiment described with reference to the accompanying drawing forming a part of this specification, and in which:

FIGURE 1 is a longitudinal cross sectional view of a power operated master cylinder embodying principles of the present invention; and FIGURE 2 is a fragmentary cross sectional view taken approximately upon the line 2—2 of FIGURE 1—the figure further schematically showing a remote braking system which it is intended to control.

The power braking unit shown in the drawing generally comprises a master cylinder A which is bolted to the end of an air pressure operated fluid pressure servomotor B, in such manner that the power driven elements of the servomotor actuate the hydraulic piston 10 of the master cylinder. The master cylinder A is of conventional construction having a fluid compensating port 12 for communicating a reservoir 14 with the portion of the fluid pressurizing chamber 16 that is forwardly of the normal retracted position of the piston 10. When the piston 10 is moved forwardly in the fluid pressurizing chamber 16, its cup-shaped seal 18 closes off the compensating port 12 and thereafter forces fluid out through the outlet port 20 which is normally communicated to the hydraulic braking system of the tractor portion of a tractor-trailer truck combination.

The fluid pressure servomotor B shown in the drawing generally comprises front and rear stamped housing sections 22 and 24 having abutting flanges thereon which are clamped together by a suitable ring 26. The internal cavity of the housing structure is divided into front and rear power chambers 28 and 30 by means of a diaphragm 32. The outer periphery of the diaphragm 32 is clamped between the flanges of the front and rear housing sections 22 and 24, and the radially inner portion of the diaphragm 32 is clamped between front and rear hub sections 34 and 36 which make up the central portion of the movable wall of the servomotor unit. A diaphragm back-up plate 38 is also clamped between the front and rear hub sections 34 and 36 to transmit force from the diaphragm 32 to these sections. Force from the front hub section 34 is transmitted to the hydraulic piston 10 by means of a headed rod 40, the rod end of which is received in a recess in the hydraulic piston 10 and the headed portion 42 of which is received in a counterbore 44 in the front face of the hub section 34. A block of rubber 45 is positioned between the bottom of the counterbore 44 and the headed portion 42 to resiliently transmit force to the hydraulic piston 10 and at the same time provide a reaction force, as will later be described.

The servomotor unit shown in the drawing is of the atmospheric suspended type in which atmospheric pressure is admitted to both the front and rear power chambers 28 and 30 in the normal de-energized condition of the servomotor. The unit shown is actuated by means of air pressure of approximately 90 p.s.i., which during actuation of the unit is admitted to the rear power chamber 30 to drive the hydraulic piston 10 forwardly into the fluid pressurizing chamber 16. The control of air pressure to the rear power chamber 30 is had by means of a control valve structure C formed within the hub sections 34 and 36 and is actuated by means of a control rod 46 which extends through the rear housing section 24. The control rod 46 is in turn actuated by means of a pivotally supported foot pedal lever which moves the control rod 46 laterally to some degree during its in-and-out control movement. To accommodate this lateral movement and at the same time provide an adequate sealing structure for the rear power chamber 30, the control rod 46 is surrounded by a flanged tube 48, the tubular portion 50 of which projects out through the rear housing section 24 and the flange portion 52 of which is suitably clamped between the rear hub section 36 and the diaphragm 32.

The front end of the flanged tube 48 is provided with a high pressure valve seat 54 which surrounds its central opening; and high pressure air of approximately 90 p.s.i. is supplied to the portion of the hub 34 forwardly of the valve seat 54 by means of a flexible tube 56. One of the flexible tubes 56 communicates externally of the housing 22 and the other end of the flexible tube 56 is connected to the passageway 58 which communicates with the high pressure valve chamber 60 that is formed within the hub 34 just forwardly of the valve seat 54. High pressure valve chamber 60 is closed off by a tubular poppet member 62 which is slidably received in the hub section 34, and which has a flange portion 64 that is adapted to abut the valve seat 54. Air leakage between the section 34 and poppet member 62 is prevented by annular cup seal 66, and the poppet member 62 is normally biased against the seat 54 by means of a coil spring 68 positioned between the flange 64 and the seal 66.

As previously indicated, atmospheric pressure is communicated to both power chambers 28 and 30 during their normal de-energized condition of the servomotor. In the embodiment shown in the drawing, this is accomplished by means of an opening 70 in the front housing section 22 which all times maintains the front power chamber 28 at atmospheric pressure. Flow of atmospheric pressure to the rear power chamber 30 is, of course, controlled by the control valve structure C. Atmospheric pressure from the front power chamber 28 is communicated to the central opening of the tubular poppet member 62 by means of passageway 72; and control of atmospheric pressure between the central opening of poppet member 62 and the rear power chamber 30 is had by means of control member 74 whose atmospheric valve seat 76 abuts the tubular poppet member 62 radially inwardly of the high pressure valve seat 54. In the de-energized condition of the servomotor shown in the drawing, the atmospheric valve seat 76 is out of engagement with the tubular poppet member 62, so that atmospheric pressure from the front power chamber 28 is communicated past the valve seat 76, through the control port 78, and thence to the rear power chamber 30 by means of a flexible tube 80 which will later be described. The control member 74 is, of course, actuated by means of the control rod 46; and in order that a reaction force will be applied to the control member 54, the control member 74 is provided with a portion 82 which projects through the tubular flange poppet member 62 into a reaction bore 84 which communicates with the rubber reaction disk 45. When the servomotor is actuated, the rubber reaction disk 45 is squeezed into the reaction chamber 84 to abut the control member 74 and oppose its energizing movement with a force generally proportional to the output force being developed by the servomotor.

As previously indicated, it is intended that the servomotor unit shown in the drawing will be used both to operate and control the hydraulic brakes of the tractor portion of a tractor-trailer truck combination; and at the same time provide a pneumatic control signal for the air pressure operated brakes of the trailer portion of the combination vehicle. The lines leading from the fluid pressure servomotor B, shown in the drawing, to the air motors 86 of the trailer (only one of which is shown) are generally quite long and contain considerable volumes of air; so that a considerable time delay is involved between the time that a pressure signal is created by the control valve structure C and a corresponding brake actuation is effected by the air motors 86.

According to principles of the present invention, means are provided in the control structure of the fluid pressure servomotor B for supplying a first air pressure to the rear power chamber 30 during actuation of the servomotor, and a second higher air pressure to the air line 88 leading to the air motors 86 of the trailer portion of the vehicle. In the embodiment shown in the drawing, the different control air pressures previously referred to are provided by a back pressure valve 90 that is supplied with air pressure from the flexible tube 80 and which discharges to the rear power chamber 30 of the servomotor. In the embodiment shown, the back pressure valve 90 is formed by a T-shaped fitting that extends through the sidewall of the rear housing section 24 and to which the flexible tube 80 is connected. The side branch of the T is suitably brazed to the housing section 24 in a manner permitting its side outlet 94 to project through the housing section, and the line 88 is suitably threaded into its side outlet port 96. Flow, therefore, from the flexible tube 80 passes through the air line 88 leading to the trailer without obstruction.

The back pressure valve 90 shown in the drawing is formed in the end of the T-shaped fitting 92 opposite from its connection with the flexible tube 80, and generally comprises a valve seat 98 formed by means of a shoulder 98 in the bottom of a counterbore 100. Flow past the valve seat 98 is controlled by means of a poppet member which, in the embodiment shown, is formed by means of a disk 102 having a diaphragm 104 stretched over its inner face and held in position by means of relatively stiff outer edges which are clamped about the outer periphery of the disk 102. The outer edge of the diaphragm 104 is biased into engagement with the valve seat 98 by means of a coil spring 106 positioned between the disk 102 and a spring retainer 108 that is held within the counterbore 100 by means of a snap ring 110. In order that flow might proceed substantially unrestricted from the rear power chamber 30 to the flexible tube 80, the diaphragm 104 is provided with a central opening 112 and the disk 102 is provided with a plurality of openings 114 which are positioned off center with respect to the opening 112 and are normally covered by the diaphragm 104. Pressure flow from the outlet to the flexible tube 80 causes the diaphragm 104, therefore, normally to close off the openings 114; while return flow from the power chamber 30 through the openings 114 lifts the diaphragm 104 away from the disk 102 and then proceeds out through the central opening 112 of the diaphragm.

In the normal de-energized condition of the power braking unit, its parts will be in their position shown in the drawing. When the control rod 46 is moved forwardly or inwardly of the unit to actuate the same, the atmospheric valve seat 76 will be moved into abutment with the flange 64 of the poppet member 62, and thereafter move it out of engagement with the high pressure valve seat 54. This movement closes off atmospheric communication with the flexible tube 80 and thereafter communicates high pressure air from the flexible tube 56 to the flexible tube 80. The pressure which is supplied the flexible tube 80 is of course communicated directly with the trailer control line 88, and is at the same time communicated to the back pressure valve 90. Spring 106 of the back pressure valve normally biases the back pressure valve closed with sufficient force to develop a pressure differential between the outlet connection 96 and the rear power chamber 30 which, in the embodiment shown in the drawing, will be approximately 20 p.s.i. differential. After this predetermined air pressure has been delivered to the outlet connection 96, the spring 106 yields to permit the diaphragm 104 to move away from the valve seat 98 and thereafter bleed air to the rear power chamber 30. The larger air pressure being supplied the air brakes of the trailer causes them to be applied either simultaneously with or slightly ahead of the hydraulic brakes of the tractor and thereby prevents jackknifing of the vehicle. Pressure admitted to the rear power chamber 30 causes the diaphragm 32 to move the hub section 34 and hydraulic piston 10 forwardly. As the hydraulic piston 10 is moved forwardly, the lip of the seal 18 closes off the compensating port 12 and thereafter forces fluid out of the outlet connection 20 to the hydraulic brakes of the tractor portion of the vehicle. As the rubber reaction disk 45 is squeezed between the headed rod 40 and the hub 34, the rubber flows up against the control member 74 to oppose the actuating force being applied to the control rod 46. When forward movement of the control rod 46 ceases, sufficient air pressure continues to flow to the rear power chamber 30 to move the diaphragm and hub portion forwardly by an amount which brings the high pressure valve seat 54 again into engagement with the poppet member 62 and thereby prevent further increase in pressure in the flexible control tube 80.

When it is desired to reduce the braking effort, a reduction in force on the control rod 46 permits the rubber reaction disk 45 to bias the control member 74 rearwardly so that the atmospheric valve seat 76 moves out of engagement with the poppet member 62, thereby allowing pressure from the flexible control tube 80 to be communicated to the front power chamber 28 and hence to the atmosphere. Air pressure from the tractor portion of the vehicle is thereby permitted to flow through the line 88 and flexible control tube 80 to the atmosphere; and when pressure in the outlet port 96 drops below that in the rear power chamber 30, air pressure flown through the openings 114 in the disk 102 to move the diaphragm 104 away from the disk and then proceed out through its central opening 112 to the control valve structure. Thereafter, the pressures in the trailer braking system and the servomotor's rear power chamber 30 will bleed down together. When the desired reduction in braking effort has been accomplished, further retraction of the control rod 46 is stopped; whereupon air flow continues out of the control tube 80 until the diaphragm structure 32 moves rearwardly a sufficient amount to again cause the poppet member 62 to close off the atmospheric valve seat 76. This holds the same air pressure in the rear power chamber 30 as is being held in the trailer portion of the vehicle so that a substantially equal braking effort is done in both portions of the vehicle. A complete retraction of the control rod 46 permits the atmospheric valve seat 76 to stay out of engagement with the poppet member 62, and thereby permit the movable wall structure to assume the position shown in the drawing and the brakes of the trailer to be completely released.

It will sometimes be advantageous to additionally provide an orifice 116 which can be added to the embodiment shown in the drawing to communicate the rear power chamber 30 to the flexible control tube 80. This permits the pressure in the rear power chamber 30 to be equalized with respect to the pressure being supplied to the trailer portion of the vehicle after the time that the brakes are initially actuated.

While the invention has been described in considerable detail, I do not wish to be limited to the particular construction shown and described; and it is my intention to cover hereby all novel adaptations, modifications and arrangements thereof which come within the practice of those skilled in the art to which the invention relates.

I claim:

1. In a braking system for a vehicle having controlling and controlled portions: a fluid pressure servomotor having a housing forming an internal chamber; a movable wall in said chamber dividing it into opposed power chambers into one of which power chambers control pressure is communicated to actuate said movable wall, said movable wall actuating said braking system of said controlling portion of said vehicle; a control valve carried by said movable wall and having a high pressure chamber, a low pressure chamber, and a control pressure chamber; a valve control member which when actuated communicates said high pressure chamber of said control valve to said low pressure chamber of said control valve; a coiled flexible tube in one of said power chambers communicating said control pressure chamber externally of said housing for connection to said controlled portion of said vehicle; and back pressure means inside said housing providing restricted flow communication between said flexible tube and said one of said opposed power chambers.

2. In a braking system for a vehicle having controlling and controlled portions: a fluid pressure servomotor having a housing forming an internal chamber; a movable wall in said chamber dividing it into opposed power chambers into one of which power chambers control pressure is communicated to actuate said movable wall, said movable wall actuating said braking system of said controlling portion of said vehicle; a control valve carried by said movable wall and having a high pressure chamber, a low pressure chamber, and a control pressure chamber; a valve control member which when actuated communicates said high pressure chamber of said control valve to said low pressure chamber of said control valve; a coiled flexible tube in said one of said power chambers communicating said control pressure chamber externally of said housing for connection to said controlled portion of said vehicle; and back pressure means inside said housing providing restricted flow communication between said flexible tube and said one of said opposed power chambers in which said flexible tube is positioned.

3. In a braking system for a vehicle having controlling and controlled portions: a fluid pressure servomotor having a housing forming an internal chamber; a movable wall in said chamber dividing it into opposed power chambers into one of which power chambers control pressure is communicated to actuate said movable wall, said movable wall actuating said braking system of said controlling portion of said vehicle; a control valve carried by said movable wall and having a high pressure chamber, a low pressure chamber, and a control pressure chamber; a valve control member which when actuated communicates said high pressure chamber of said control valve to said low pressure chamber of said control valve; a coiled flexible tube in one of said power chambers communicating said control pressure chamber externally of said housing for connection to said controlled portion of said vehicle; a flow passage communicating said flexible tube to said one of said opposed power chambers, said flow passage having a valve port therein, a valve closure member having an end surface subjected to pressure in said flexible tube and closing said port when in one position and opening said port when moved away from said flexible tube by said pressure, and a spring biasing said valve closure member to its closed position.

References Cited in the file of this patent

UNITED STATES PATENTS

| 1,872,659 | Bragg et al. | Aug. 23, 1932 |
| 2,725,073 | Edge et al. | Nov. 29, 1955 |